United States Patent
Miyazawa et al.

(10) Patent No.: US 7,729,064 B2
(45) Date of Patent: Jun. 1, 2010

(54) LENS FRAME STRUCTURE

(75) Inventors: Takashi Miyazawa, Hachioji (JP); Shuhei Kaneko, Hino (JP); Takeshi Hiroshima, Hachioji (JP)

(73) Assignees: Olympus Corporation (JP); Olympus Imaging Corp. (JP)

( * ) Notice: Subject to any disclaimer, the term of this patent is extended or adjusted under 35 U.S.C. 154(b) by 218 days.

(21) Appl. No.: 11/781,612

(22) Filed: Jul. 23, 2007

(65) Prior Publication Data

US 2008/0024886 A1 Jan. 31, 2008

(30) Foreign Application Priority Data

Jul. 27, 2006 (JP) ............................... 2005-205144

(51) Int. Cl.
*G02B 7/02* (2006.01)

(52) U.S. Cl. .................... 359/819; 359/822; 359/811

(58) Field of Classification Search ................ 359/819, 359/822, 823, 826
See application file for complete search history.

(56) References Cited

FOREIGN PATENT DOCUMENTS

| JP | 2005-292514 | 10/2005 |
| JP | 2006-91208 | * 4/2006 |

* cited by examiner

*Primary Examiner*—Timothy J Thompson
(74) *Attorney, Agent, or Firm*—Ostrolenk Faber LLP

(57) ABSTRACT

There is disclosed a lens frame structure having a movable lens holding frame, a shaft which guides movement of the lens holding frame and a support member which supports the shaft. Owing to an impact force applied to a lens frame, the lens holding frame and the support member are able to relatively move in an axial direction of the shaft to come in face contact with each other. At least a part of regions of the lens holding frame and the support member which come in face contact with each other are slant surfaces with respect to the shaft.

Otherwise, the regions of the lens holding frame and the support member which come in face contact with each other can be a pair of a concave surfaces and a convex surface (a wedge surface, a curved surface, a conical surface or the like) substantially parallel to each other.

17 Claims, 13 Drawing Sheets

LENS FRAME STRUCTURE

CROSS-REFERENCE TO RELATED APPLICATION

This application is based upon and claims the benefit of priority from prior Japanese Patent Application No. 2006-205144 filed on Jul. 27, 2006, the entire contents of which are incorporated herein by reference.

BACKGROUND OF THE INVENTION

1. Field of the Invention

The present invention relates to a lens frame structure which moves a lens frame forwards and backwards.

2. Description of the Related Art

In a lens barrel in which a lens frame capable of moving forwards and backwards is incorporated, it is demanded that, even if impact is applied to a camera owing to drop or the like, the incorporated lens frame should move so that a lens is protected from breakage.

An actuator unit disclosed in Japanese Patent Application Laid-Open No. 2005-292514 is a unit which is applicable to an optical device of a small-sized camera. This actuator unit has a lens frame structure which moves the lens frame forwards and backwards along a guide shaft. In a case where an impact force is applied to this actuator unit in an optical axis direction, the lens frame moves in the optical axis direction and abuts on a comparatively large abutment surface crossing an optical axis at right angles to suppress concentration of stress at contact, so that the breakage of a lens is prevented.

On the other hand, another conventional lens barrel has a lens barrel structure shown in an enlarged view of a main part in FIG. 12. This lens barrel 100 has a barrel main body 101, a guide shaft 102 fixed to the barrel main body 101 in parallel with a lens optical axis O, and a lens frame 103 supported by the guide shaft 102. The lens frame 103 is formed into an L-shape, and has a guide portion 103a fitted into the guide shaft 102 and a lens holding portion 103b which holds a lens 104.

In a case where the conventional lens barrel 100 shown in FIG. 12 receives an impact force and the lens frame 103 drops down along the guide shaft 102 in an S0 direction, as shown in a collision state diagram of FIG. 13, either of the guide portion 103a and the lens holding portion 103b collides with an abutment surface 101a or 101b crossing the optical axis O at right angles. Even after the collision, as shown in a repulsive state diagram of FIG. 14, the portion is repulsed from the abutment surface 101a, 101b owing to repulsion to move in an S1 direction.

SUMMARY OF THE INVENTION

A lens frame structure of the present invention has a movable lens holding frame, a shaft which guides movement of the lens holding frame and a support member which supports the shaft. Owing to an impact force applied to a lens frame, the lens holding frame and the support member relatively move in an axial direction of the shaft to come into face contact with each other. At least a part of regions of the lens holding frame and the support member which come into face contact with each other are slant surfaces with respect to the shaft.

For example, the regions of the lens holding frame and the support member which come into face contact with each other are all flat surfaces that are substantially parallel to each other and that slant with respect to the shaft. Alternatively, the regions of the lens holding frame and the support member which come into face contact with each other may be a concave surface and a convex surface (a wedge surface, a curved surface, a conical surface or the like) which are substantially parallel to each other.

One example of a constitution of the present invention can be represented as follows. A lens frame structure comprising: a shaft member along which a lens holding frame moves; the lens holding frame having a holding frame portion which holds a lens and a shaft fitting portion which is integrally formed with this holding frame portion and which fits into the shaft member to slide along the shaft member, a shaft end surface of the shaft fitting portion including a slant surface with respect to the center axis of the shaft member; and a shaft support member which supports the shaft member and which includes an abutment surface to come into face contact with the shaft end surface of the lens holding frame and abut on the shaft end surface.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
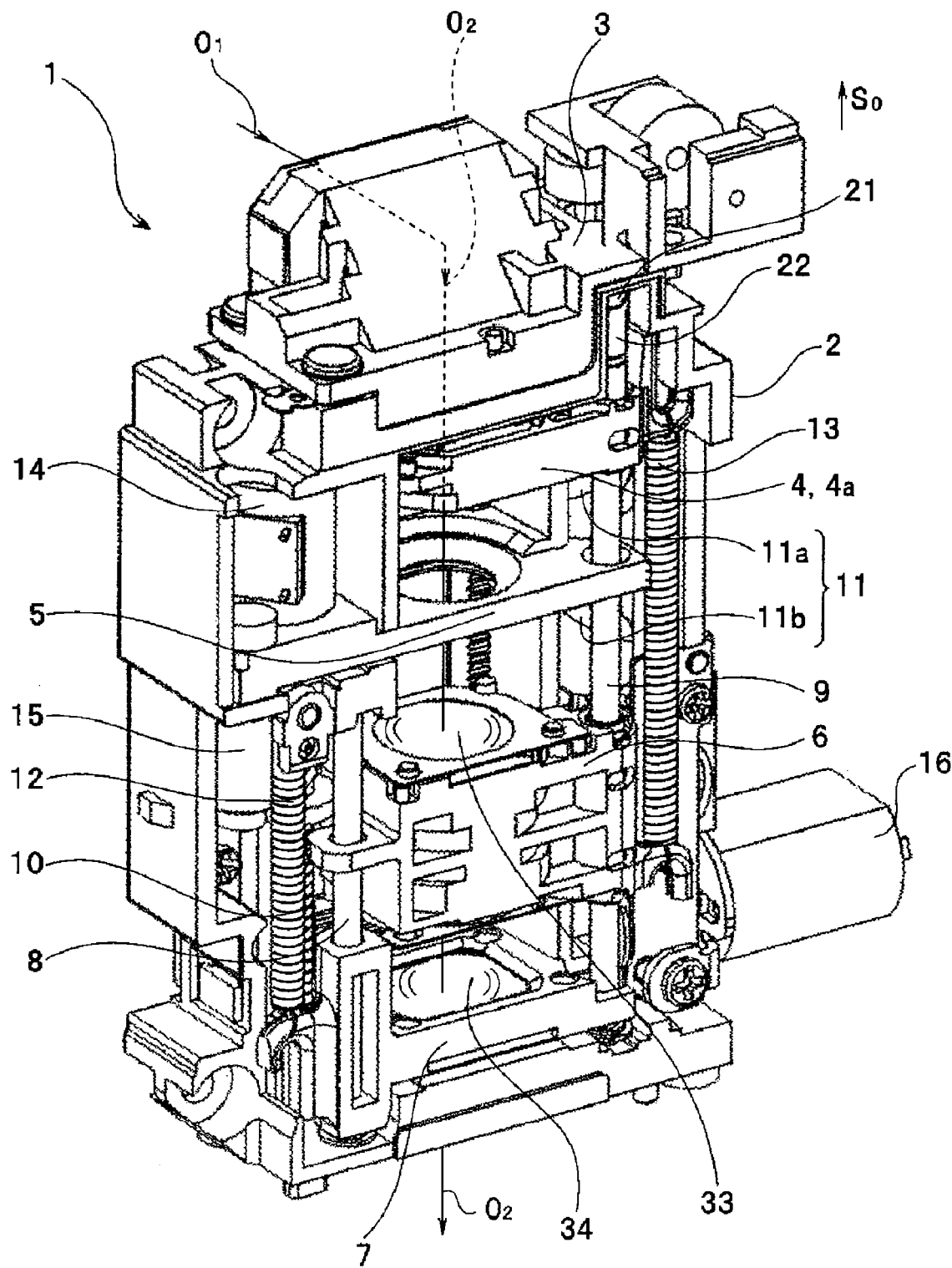
FIG. 1 is a perspective view of a lens barrel device to which a lens frame structure according to one embodiment of the present invention is applied.
Figure 2:
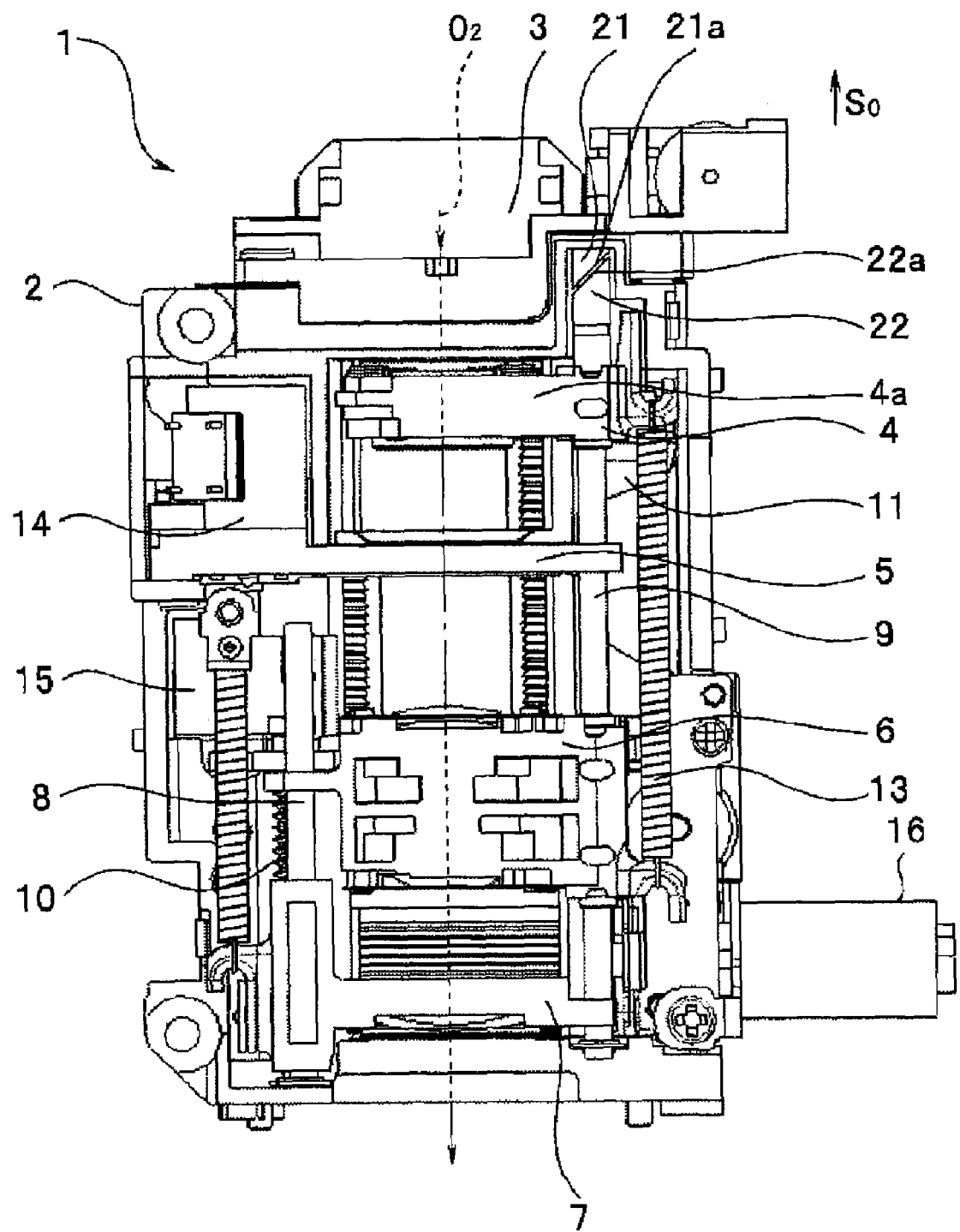
FIG. 2 is a back view of the lens barrel device of FIG. 1.
Figure 3:
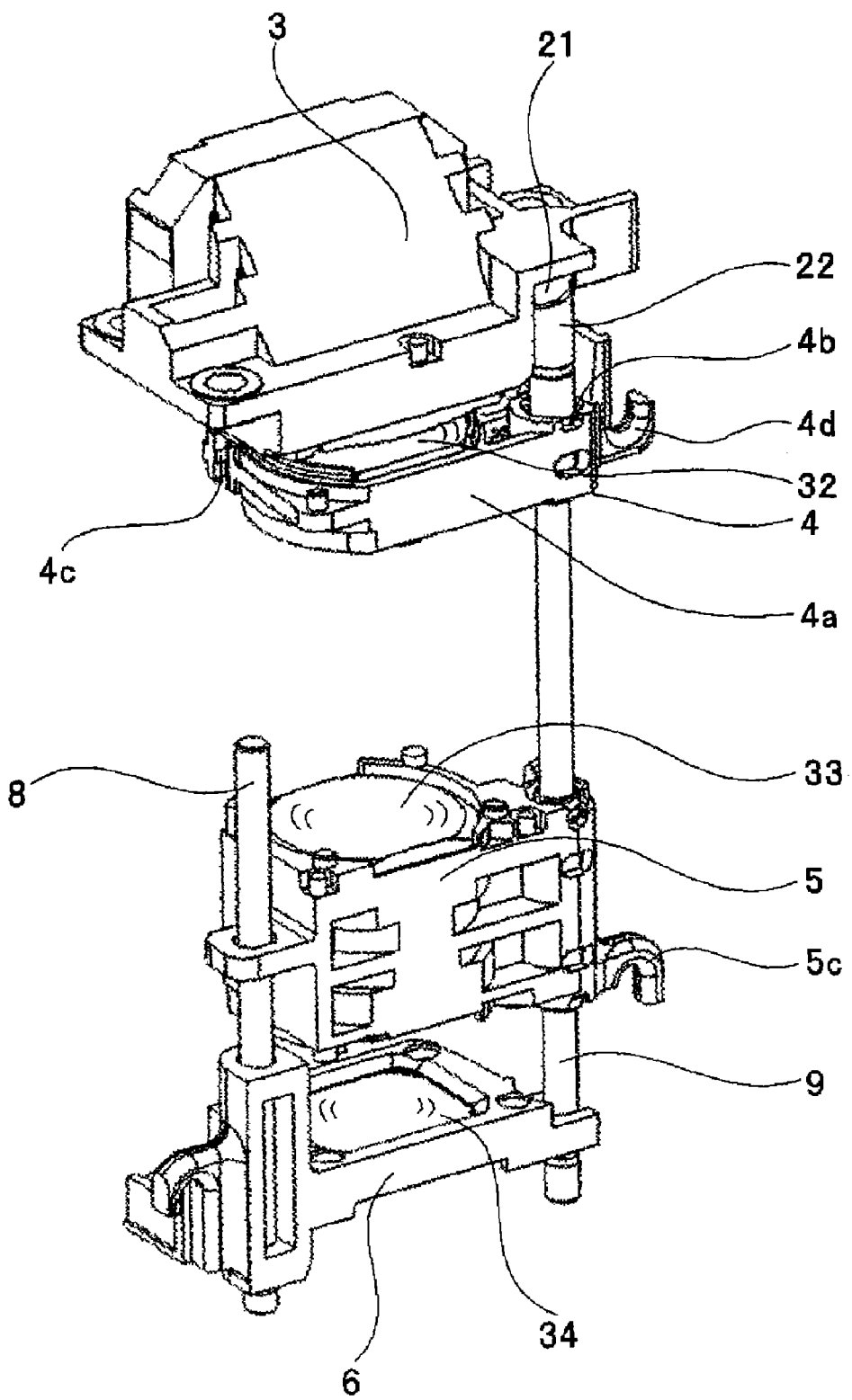
FIG. 3 is a perspective view of a lens frame unit constituting the lens barrel device of FIG. 1.
Figure 4:
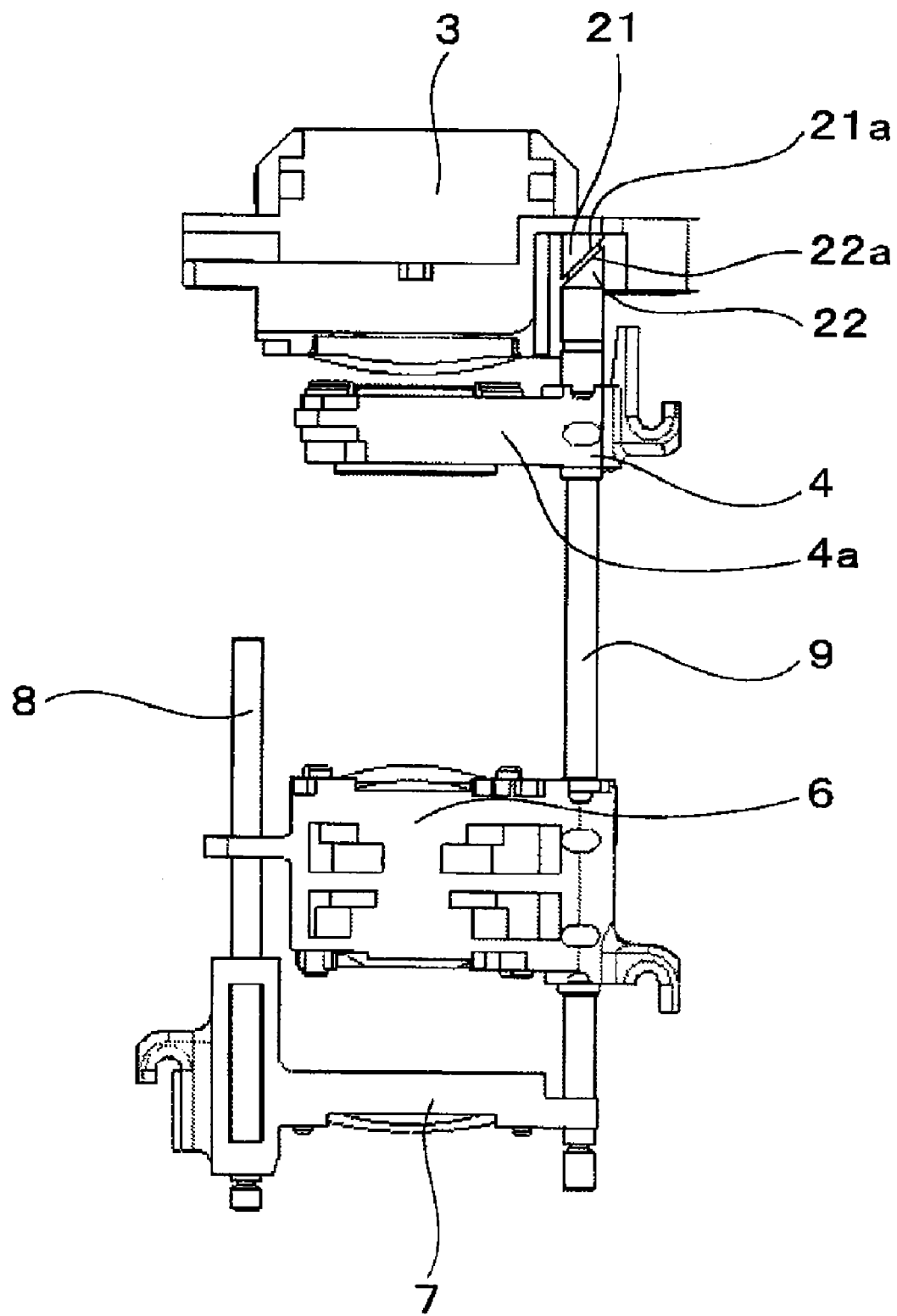
FIG. 4 is a back view of the lens frame unit of FIG. 3.
Figure 5:
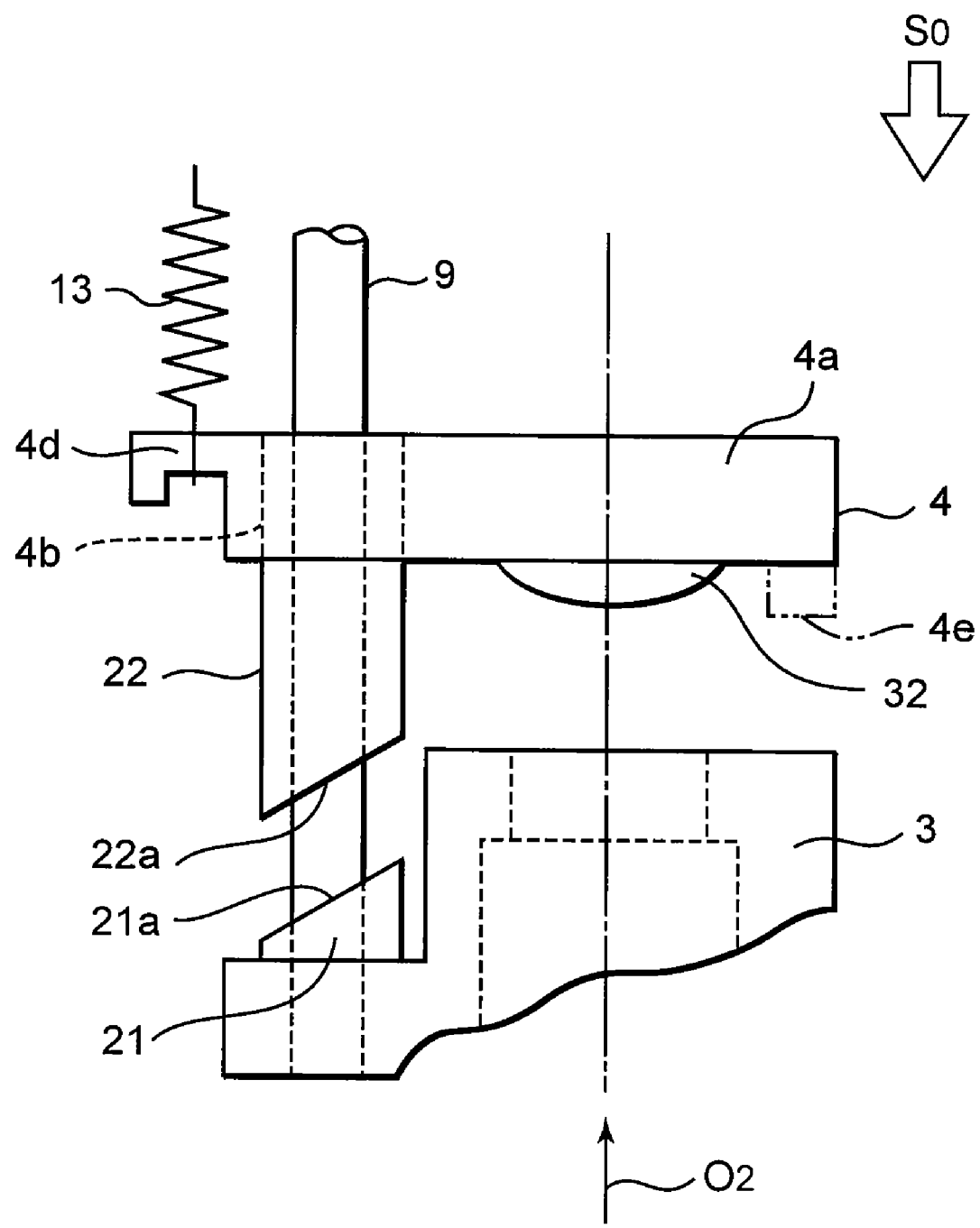
FIG. 5 shows a state of a second lens frame of the lens frame unit immediately before a camera in which the lens barrel device of FIG. 1 is incorporated drops down.
Figure 6:
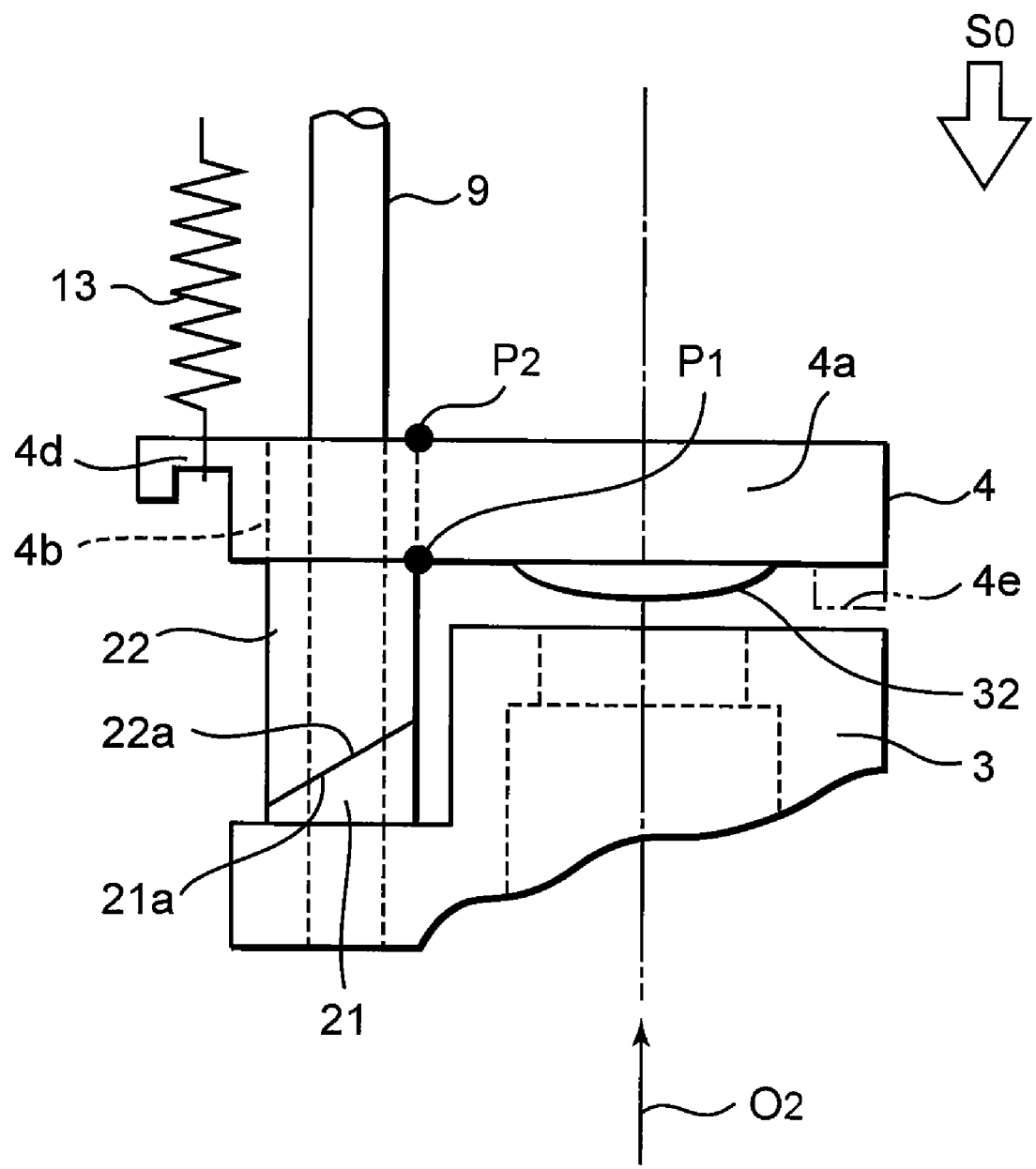
FIG. 6 shows a state in which the camera drops down from the state of FIG. 5 and the second lens frame collides with a first lens frame.

FIG. 1 is a perspective view of a lens barrel device to which a lens frame structure according to one embodiment of the present invention is applied. FIG. 2 is a back view of the lens barrel device. FIG. 3 is a perspective view of a lens frame unit constituting the lens barrel device. FIG. 4 is a back view of the lens frame unit. FIGS. 5, 6 show a behavior of a second lens frame of the lens frame unit in a case where a camera in which the lens barrel device is incorporated drops down, FIG. 5 shows a state immediately before the camera drops down, and FIG. 6 shows a state in which the camera drops down and the second lens frame collides with a first lens frame.

As shown in FIG. 1, a lens barrel device 1 to which a lens frame structure of the present embodiment is applied has a fixed frame 2 having a box-like shape, a first lens frame 3, a second lens frame 4 of a lens holding frame disposed along an optical axis O2 (described later) under the first lens frame 3, a shutter frame 5, a third lens frame 6 and a fourth lens frame 7. Furthermore, the lens barrel device 1 has the guide shafts 8, 9 which are shaft members supported by the fixed frame 2 and the first lens frame 3 in parallel with the optical axis O2, a lead screw 10, a zoom cam 11, a shutter driving motor 14, a focusing motor 15 and a zooming motor 16.

The first lens frame 3 is secured and attached to an upper portion of the fixed frame 2, and contains a first lens (not shown) having an optical axis O1 and a mirror (not shown) for bending the optical axis O1 by 90° toward the optical axis O2. Beside the first lens frame, a shaft support portion 21 is fixed as a shaft support member which supports a guide shaft 9. A protruding undersurface of this shaft support portion 21 (on the side of the second lens frame 4) is provided with a slant surface 21a as a flat surface which slants with respect to the direction of the guide shaft 9 direction (FIG. 5). An externally extending normal of the slant surface 21a tilts away from the center axis of the guide shaft 9.

The second lens frame 4 has a holding frame portion 4a which holds a second lens 32 and which is made of a synthetic resin, and a sleeve 22 made of a metal. The sleeve 22 made of the metal is a member which is fitted into a fitting hole 4b of the holding frame portion 4a and fixed with adhesive, and is a shaft fitting portion through which the guide shaft 9 slidably extends. The holding frame portion 4a is provided with a cutout-like guide groove 4c (not shown) on the side opposite to the fitting hole 4b. On the side provided with the fitting hole 4b of the holding frame portion 4a, a spring hook 4d is disposed at which a tension spring 13 is hooked. The guide groove 4c is slidably fitted into a guide protrusion (not shown) provided at the fixed frame 2. The second lens frame 4 is urged by the tension spring 13 in such a direction that the second lens frame 4 comes close to the third lens frame 6. In this state, the second lens frame 4 is slidably supported by the guide shaft 9 while rotation of the second lens frame 4 is regulated by the guide protrusion of the fixed frame 2.

A tip end surface of the sleeve 22 on a shaft end side is provided with a slant surface 22a as a flat surface which slants with respect to the guide shaft 9 direction (i.e., a direction parallel to the optical axis O2) (FIG. 5). The externally extending normal of the slant surface 22a tilts away from the center axis of the guide shaft 9, and this slant surface is a surface parallel to the slant surface 21a of the shaft support portion 21. Therefore, in a case where the second lens frame 4 receives an external force to move until the frame abuts on the shaft support portion 21, the slant surface 22a comes into face contact with the slant surface 21a.

The shutter frame 5 is secured to and supported by the fixed frame 2, and an openable/closable shutter plate is stored in the shutter frame. The shutter plate is driven by the shutter driving motor 14 to open or close.

The third lens frame 6 is a holding frame which holds a third lens 33 and which is made of a synthetic resin. The third lens frame 6 is slidably supported by the guide shaft 9 in an optical axis O2 direction in a state in which rotation of the frame is regulated by the guide shaft 8.

The fourth lens frame 7 is a holding frame which holds a fourth lens 34 and which is made of a synthetic resin. The fourth lens frame 7 is disposed in front of a CCD (not shown) disposed under the lens barrel device 1. This fourth lens frame 7 is slidably supported by the guide shaft 8 in the optical axis O2 direction in a state in which rotation of the frame is regulated by the guide shaft 9. The fourth lens frame 7 is held so as to abut on a nut member into which the lead screw 10 is screwed by an urging force of a tension spring 12.

The zoom cam 11 has a cylindrical end surface cam portion 11a formed at an upper end portion and a cylindrical groove cam portion 11b provided at the center portion. A cam abutment portion (not shown) of the second lens frame 4 receives the urging force of the tension spring 13 to abut on the cylindrical end surface cam portion 11a from the side of the upper end. A driven pin portion (not shown) of the third lens frame 6 is slidably fitted into the cylindrical groove cam portion 11b.

During zooming, when the zoom cam 11 rotates, the second lens frame 4 is driven to move forwards and backwards in the optical axis O2 direction via the cylindrical end surface cam portion 11a. The third lens frame 6 is simultaneously moved forwards and backwards in the optical axis O2 direction by the cylindrical groove cam portion 11b.

On the other hand, during focusing, the fourth lens frame 7 is driven forwards and backwards via the lead screw 10 rotated by the focusing motor 15 to move in the optical axis O2 direction.

The lens barrel device 1 constituted as described above is incorporated in a camera in a state in which the device is fixed to an outer cover of the camera. When the camera drops down, each constituting member of the lens barrel device 1 receives an impact force. Especially, in a case where the camera drops down upside down (drops down in an S0 direction of FIGS. 1, 2) and the impact force is not less than a predetermined level, the second lens frame 4 comes away from the cylindrical end surface cam portion 11a of the zoom cam 11 against the urging force of the tension spring 13, and the slant surface 22a of the sleeve 22 collides with the slant surface 21a of the shaft support portion 21 on a first lens frame 3 side, and receives the impact force (FIG. 6).

However, since the slant surface 22a of the second lens frame 4 collides with the slant surface 21a to receive the impact force as described above, an abutment surface pressure decreases as compared with a case where vertical surfaces abut on each other. Since a force is generated in a direction of the normal of the slant surfaces, the guide shaft 9 slightly bends, and the second lens frame 4 slightly moves along the slant surface owing to a fitting gap between the second lens frame 4 and the guide shaft 9. Because of these movements, the impact force is absorbed. Moreover, bounce of the second lens frame 4 after the collision is reduced. These phenomena have been clarified also by simulations.

Therefore, a stress due to impact generated at upper and lower bonded portions P2, P1 between the holding frame portion 4a of the second lens frame 4 and the sleeve 22 is suppressed to prevent damage and deformation of the portions.

As described above, according to the lens barrel device 1 of the first embodiment, in a case where the impact force is received, even if the second lens frame 4 moving along the guide shaft 9 receives the impact at the end portion (the shaft support portion 21) of the guide shaft 9, the slant surfaces (22a, 21a) abut on each other at the end portion of the guide shaft 9. In consequence, the impact force is absorbed. This constitution is effective in preventing damages of the bonded portions between the lens holding portion of the second lens frame 4 and the sleeve portion.

It is to be noted that the first embodiment is assumed to have a structure in which, in a case where the second lens frame 4 receives the impact in the S0 direction as shown in FIG. 5, the second lens frame abuts on the only sleeve 22. However, the present invention is not limited to this structure. Even when a tip end portion 4e of the lens holding portion 4a of the second lens frame 4 and an end surface of the first lens frame 3 are slant surfaces and the slant surfaces are allowed to abut on each other during collision, a similar effect can be produced. Even in such a structure, it is considered that, owing to fluctuations of member dimensions, rattle and the like, the slant surface 22a may abut on the slant surface 21a before the tip end portion 4e abuts on the end surface. Therefore, when the impact force is exerted, the impact force can similarly be absorbed by one or both of sets of the slant surfaces.

Moreover, in the first embodiment, the sleeve 22 provided at the second lens frame 4 is a separate member made of a metal. However, the present invention is not limited to this embodiment. Even in a case where a sleeve is integrally molded with the holding frame portion 4a, when an end portion is provided with a similar slant surface, a similar effect can be produced.

Furthermore, slant directions of the slant surfaces 22a and 21a are not limited to those of the first embodiment described above, and slant surfaces slanted in different directions in accordance with a shape of the second lens frame may be adopted so as to obtain a further effect.

Figure 7:
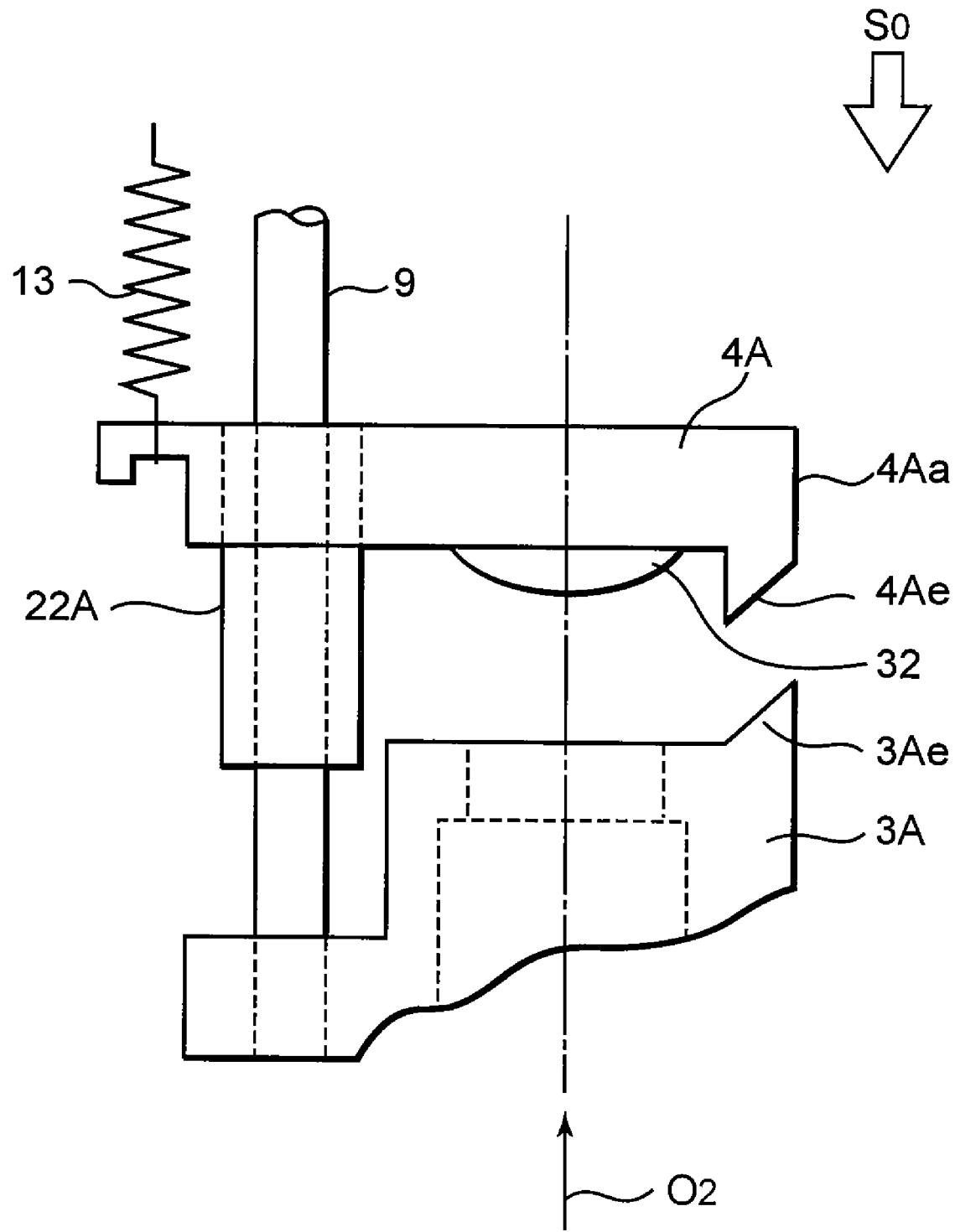
FIG. 7 shows a state of the second lens frame immediately before the camera drops down in a case where a modification of the second lens frame of the lens barrel device of FIG. 1 is applied.
Figure 8:
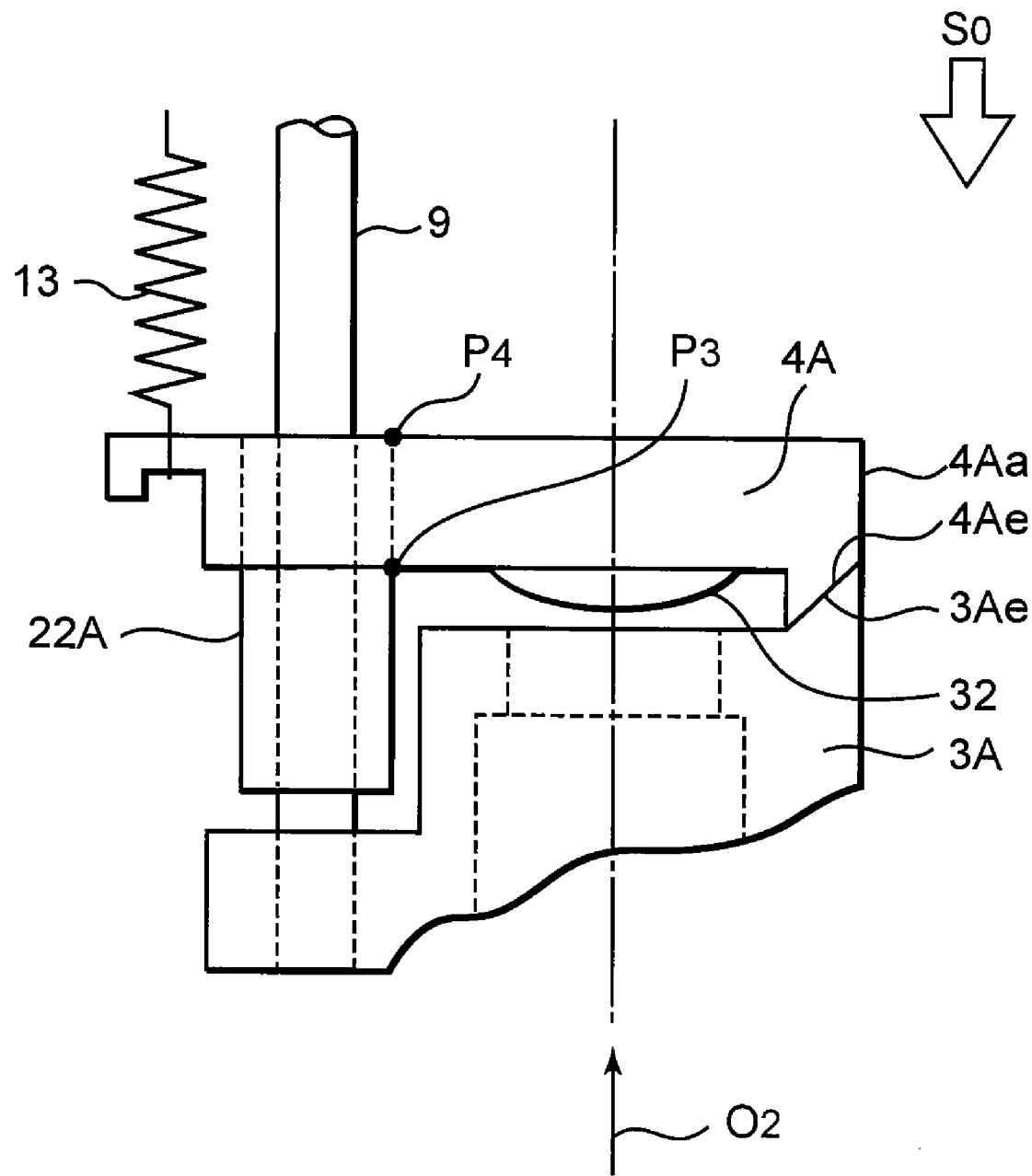
FIG. 8 shows a state in which the camera drops down from the state of FIG. 7 and the second lens frame of the modification collides with a first lens frame.

In addition, as shown in FIG. 7, a modification may be proposed in which, instead of disposing the slant surface at a sleeve 22A provided at a second lens frame 4A, a tip end portion of a lens holding portion 4Aa is provided with a slant surface 4Ae, and a slant surface 3Ae capable of abutting on the slant surface 4Ae is disposed on the side of a first lens frame 3A. In this modification, when impact is received in an S0 direction, the second lens frame 4A moves in the S0 direction, and the slant surface 4Ae abuts on the slant surface 3Ae as shown in FIG. 8. Even in this modification, since the slant surfaces abut on each other, an impact force is absorbed in the same manner as in the above embodiment, a stress due to the impact generated at bonded portions P3, P4 of the lens holding portion 4Aa is suppressed, and damage and deformation of the portion are prevented. This art shown in FIG. 7 may be used together with the above art shown in FIG. 5.

Next, a second embodiment of the present invention will be described. Since a large part of the second embodiment is the same as that of first embodiment, only respects different from the first embodiment will be described below.

Figure 9:
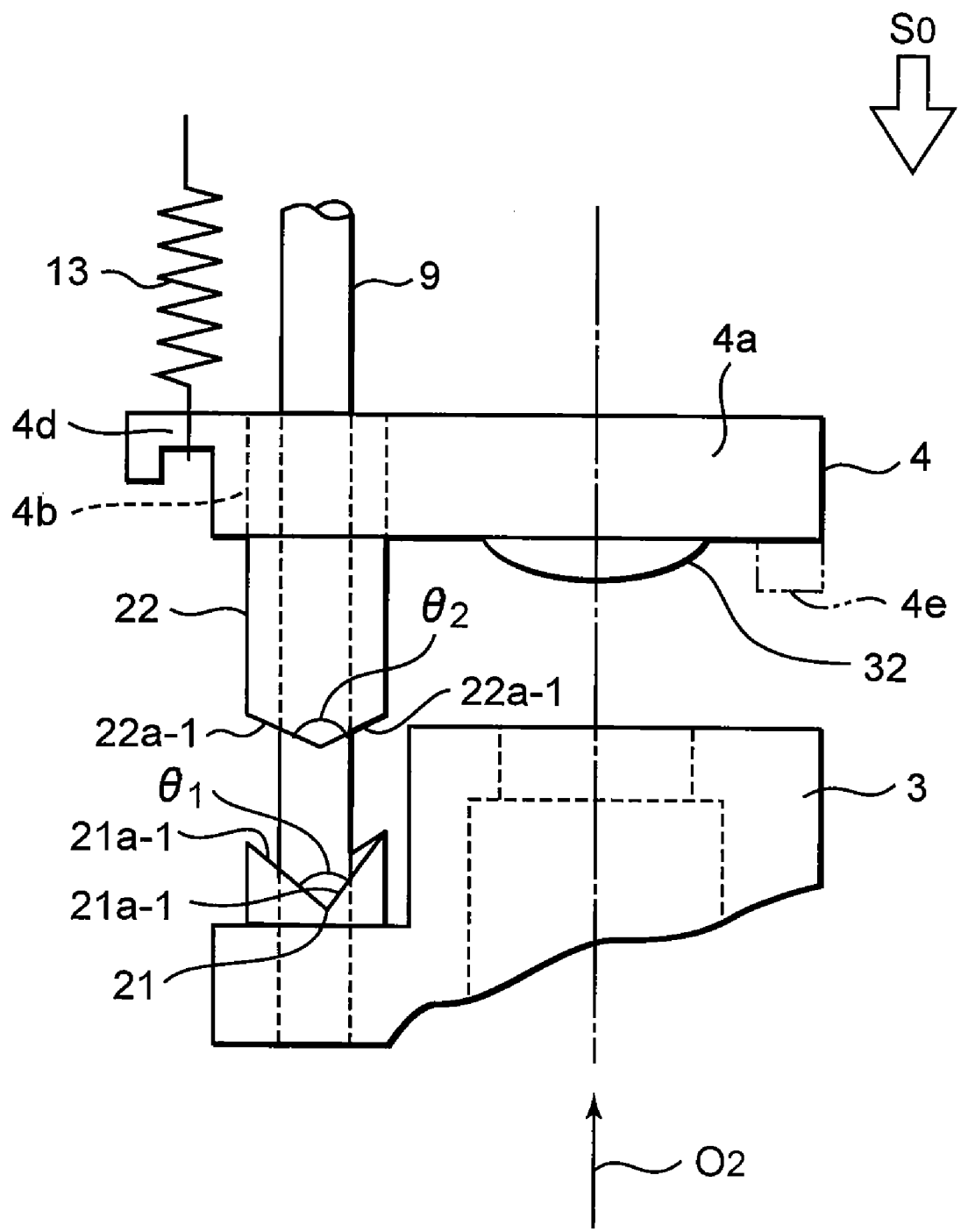
FIG. 9 is a diagram showing a state of a lens frame of a lens barrel device of a second embodiment before a camera drops down.

FIG. 9 is a diagram corresponding to FIG. 5 of the first embodiment. As shown in FIG. 9, the slant surface 22a of the first embodiment is formed into a V-shaped wedge shape in the second embodiment. A tip end of the slant surface has an abutment surface 22a-1 having a wedge angle θ2. Moreover, the slant surface 21a of the first embodiment turns to an abutment surface 21a-1 as a concave surface of the V-shape having an open angle θ1 in the second embodiment. In this case, θ2>θ1 is set. That is, the tip end angle θ2 of a wedge on a convex side is set to be larger than the tip end angle θ1 of a wedge receiving concave side.

In consequence, when impact is applied to a lens frame, the abutment surface 22a-1 having the wedge shape bites into a V-shape while opening the angle θ1 of the partner abutment surface 21a-1, and an impact force is absorbed.

Moreover, even when the abutment surface having the wedge shape is constituted on the side of a fixed frame and the abutment surface as an upper concave surface of the V-shape is constituted on the side of a lens frame, a similar effect is obtained.

Next, a third embodiment of the present invention will be described. Since a large part of the third embodiment is the same as that of first embodiment, only respects different from the first embodiment will be described below.

Figure 10:
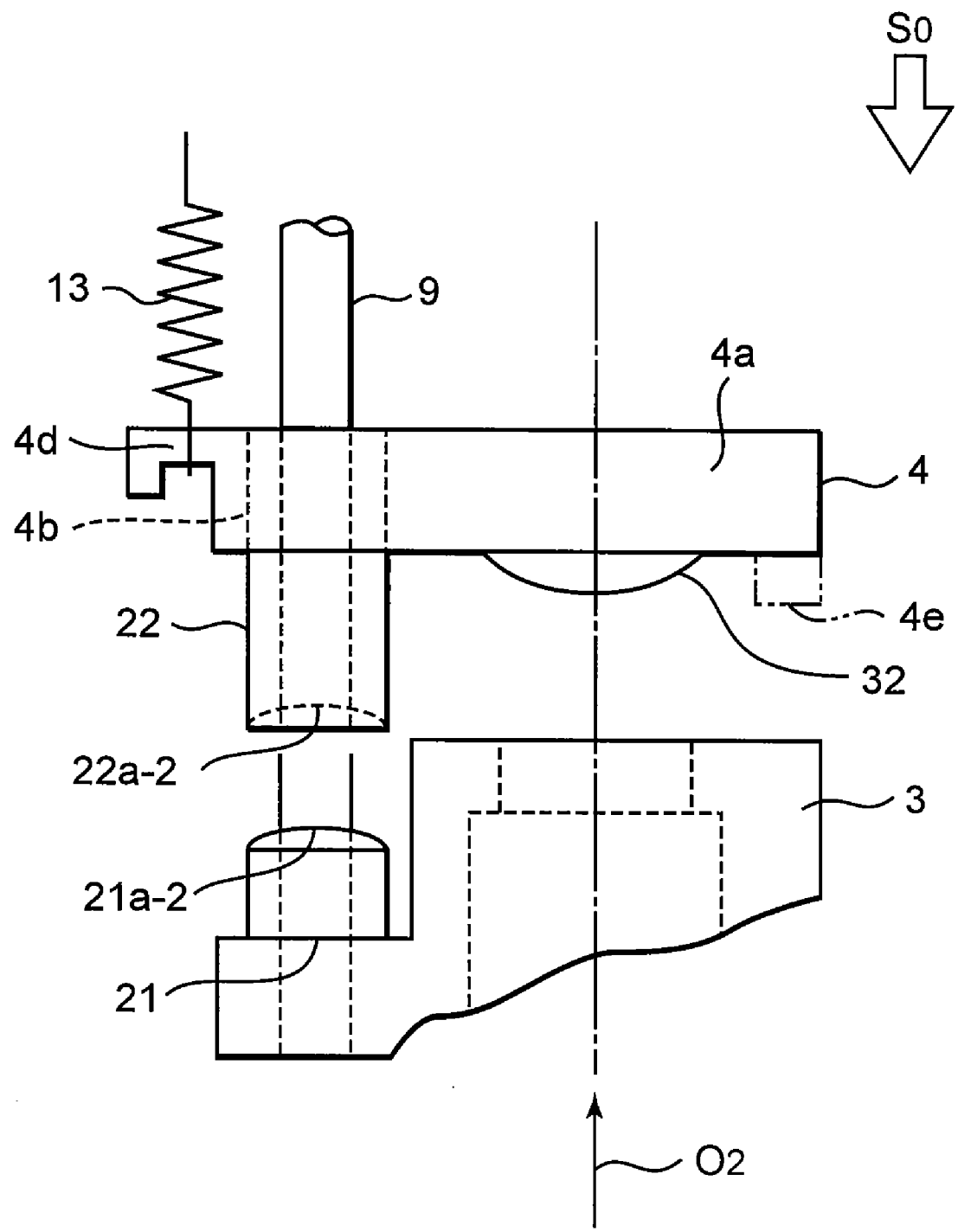
FIG. 10 is a diagram showing a state of a lens frame of a lens barrel device of a third embodiment before a camera drops down.

FIG. 10 is a diagram corresponding to FIG. 5 of the first embodiment. As shown in FIG. 10, the slant surface 22a of the first embodiment is replaced with a concave abutment surface 22a-2 formed into a spherical surface or an R-surface having a curvature in the third embodiment. The slant surface 21a of the first embodiment turns to a convex abutment surface 21a-2 formed into a spherical surface or an R-surface having a curvature in the third embodiment. In this case, a relation between a radius R1 of curvature of the abutment surface 21a-2 and a radius R2 of curvature of the abutment surface 22a-2 is set to R2<R1. That is, the radius R1 of curvature of the curved surface on a convex side is set to be larger than the radius R2 of curvature on a concave side.

In consequence, in a case where impact is applied to a lens frame, while the abutment surface 22a-2 having the radius R2 abuts on the partner abutment surface 21a-2 to reduce the curvature thereof, the surface is deformed to absorb an impact force.

Moreover, the concave abutment surface may be formed on a fixed frame side, and the convex abutment surface may be formed on a lens frame side. At this time, a relation between a radius R1' of curvature of the concave abutment surface and a radius R2' of curvature of the convex abutment surface is set to R2'>R1'.

Next, a fourth embodiment of the present invention will be described. Since a large part of the fourth embodiment is the same as that of first embodiment, only respects different from the first embodiment will be described below.

Figure 11:
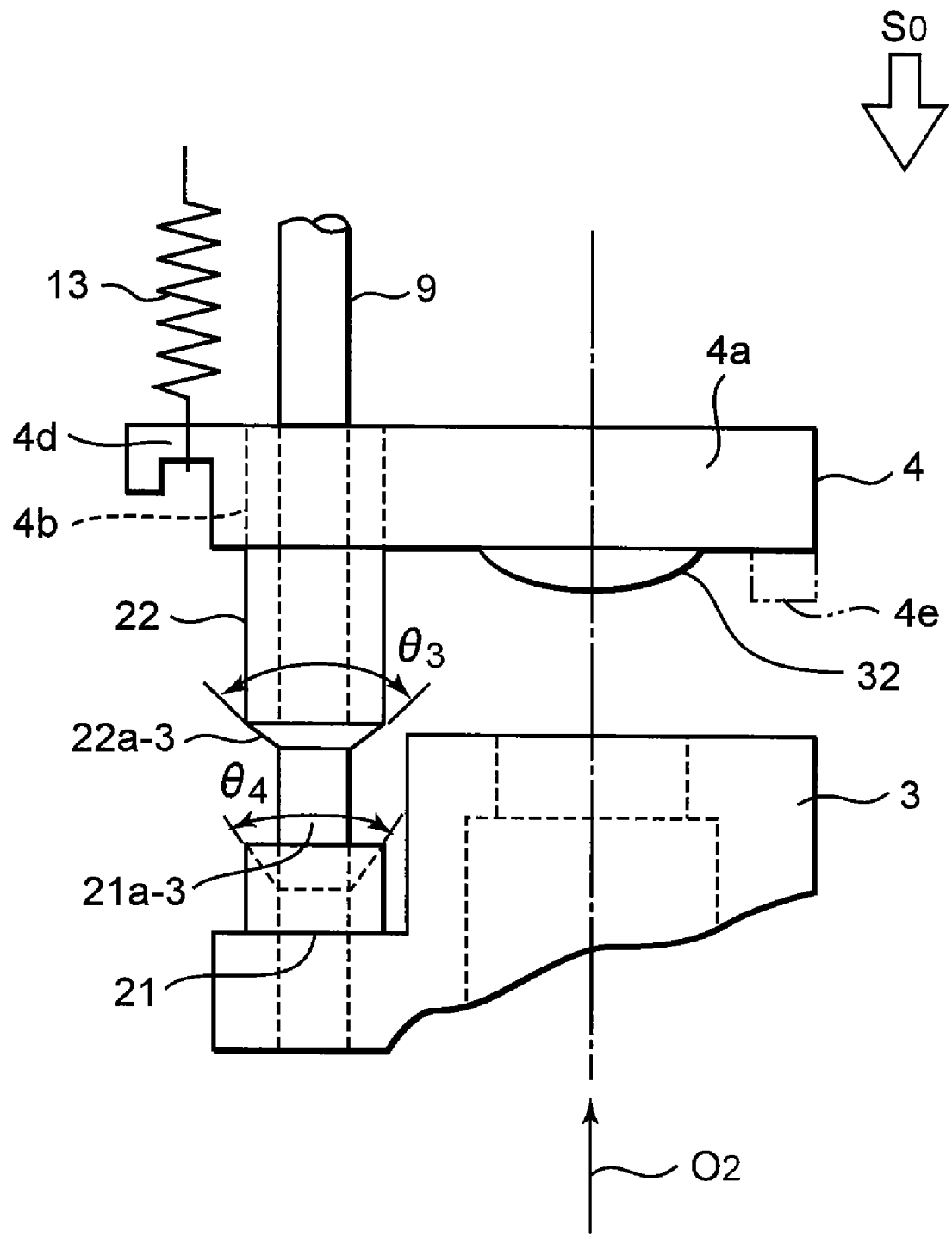
FIG. 11 is a diagram showing a state of a lens frame of a lens barrel device of a fourth embodiment before a camera drops down.
Figure 12:
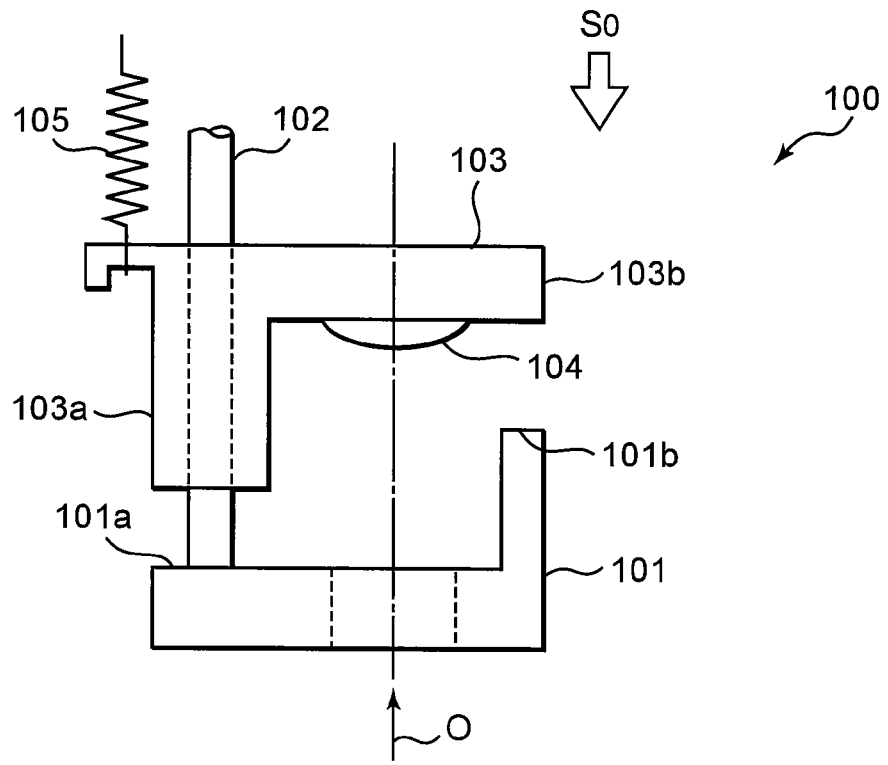
FIG. 12 is a sectional view of a main part of a conventional lens barrel.
Figure 13:
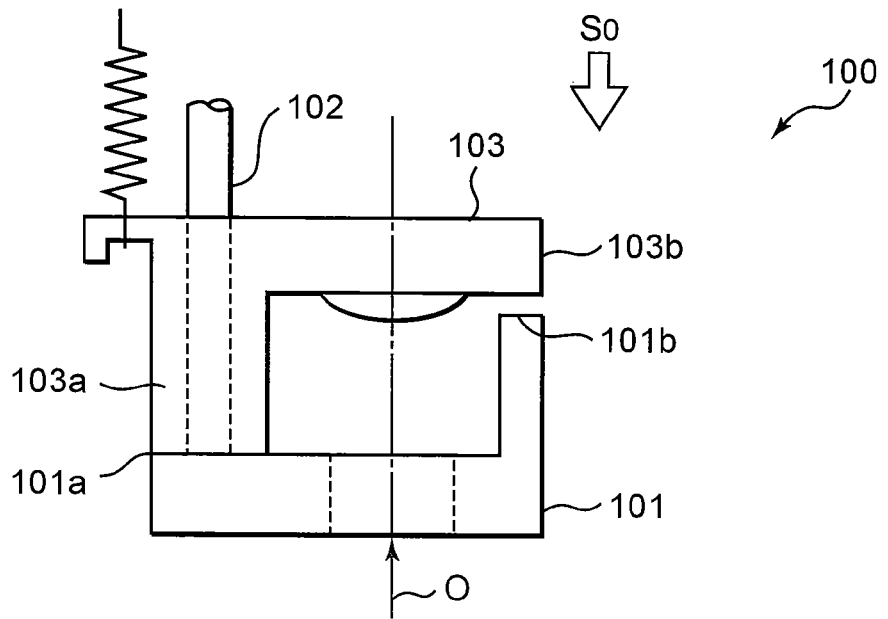
FIG. 13 is a diagram of a collision state of the lens barrel of FIG. 12.
Figure 14:
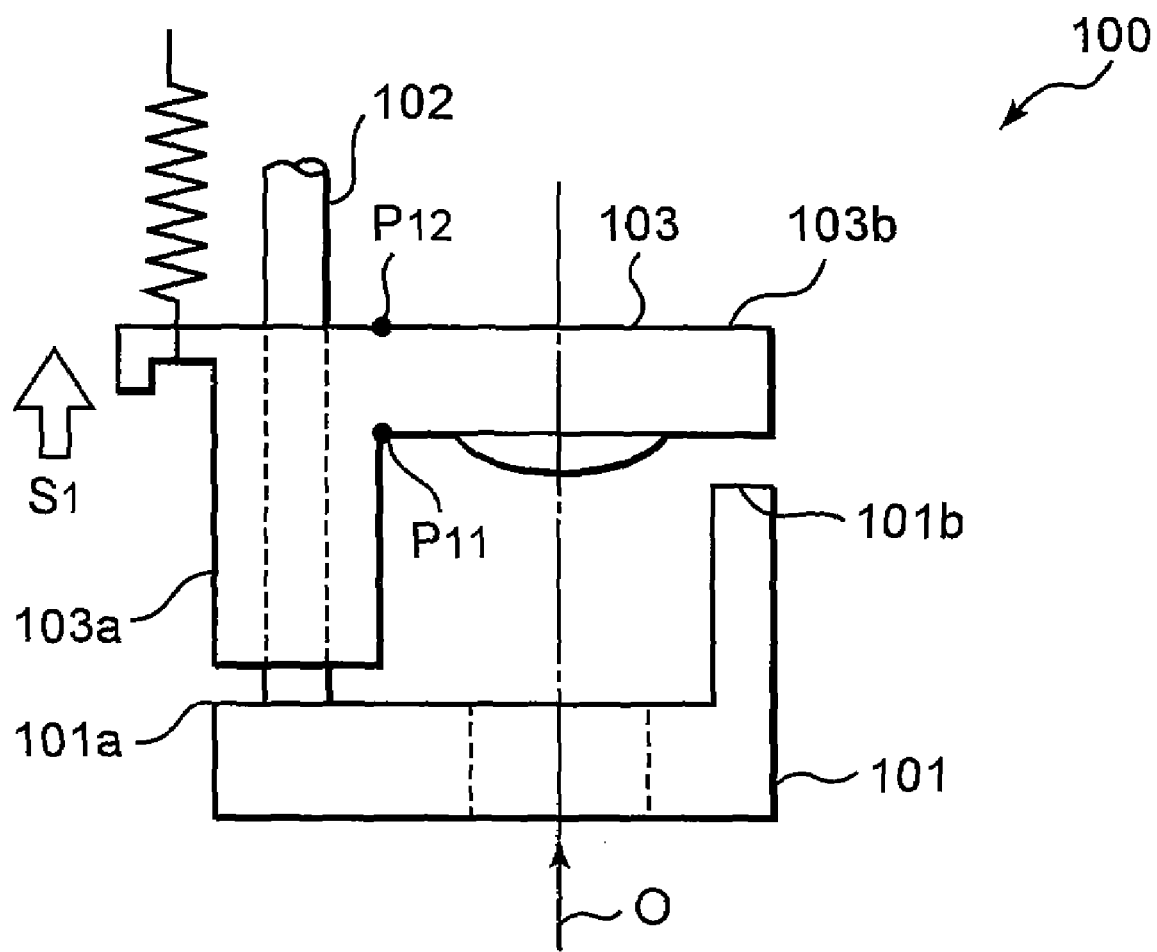
FIG. 14 is a diagram of a repulsive state after collision of the lens barrel of FIG. 12.

FIG. 11 is a diagram corresponding to FIG. 5 of the first embodiment. As shown in FIG. 11, the slant surface 22a of the first embodiment is replaced with a convex conical abutment surface 22a-3 in the fourth embodiment. The slant surface 21a of the first embodiment turns to a conical abutment surface 21a-3 in the third embodiment. Here, an open angle θ3 of the convex conical abutment surface 22a-3 is larger than an open angle θ4 of the concave conical abutment surface 21a-3. Functions of these abutment surfaces are similar to those of the second and third embodiments.

The lens frame structure according to the present invention is effective in efficiently absorbing an impact force owing to drop or the like with a simple constitution to prevent damage of a lens frame.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A lens frame structure comprising: a shaft member along which a lens holding frame moves; the lens holding frame having a holding frame portion which holds a lens and a shaft fitting portion which is formed integrally with this holding frame portion and which fits the shaft member to slide along the shaft member, an end surface of the shaft fitting portion including a slant surface with respect to the center axis of the shaft member; and a shaft support member which supports the shaft member and which includes an abutment surface to come in face contact with the end surface of the shaft fitting portion to abut on the shaft end surface, wherein the abutment surface of the shaft support member is a slant surface with respect to the center axis of the shaft member, and the slant surface of the end surface and the abutment surface are flat surfaces.

2. The lens frame structure according to claim 1, wherein the shaft support member is a fixed frame member.

3. The lens frame structure according to claim 1, wherein the lens holding frame is formed of a synthetic resin material.

4. The lens frame structure according to claim 1, wherein the shaft fitting portion of the lens holding frame comprises a sleeve made of a metal.

5. The lens frame structure according to claim 1, wherein the end surface of the shaft fitting portion and the abutment surface of the shaft support member have a V-shape.

6. The lens frame structure according to claim 1, wherein the end surface of the shaft fitting portion and the abutment surface of the shaft support member have a conical shape.

7. The lens frame structure according to claim 1, wherein the end surface of the shaft fitting portion and the abutment surface of the shaft support member have a spherical shape.

8. A lens frame structure comprising: a shaft member along which a lens holding frame moves; the lens holding frame having a holding frame portion which holds a lens and a shaft fitting portion which is formed integrally with this holding frame portion and which fits the shaft member to slide along the shaft member, an end surface of the shaft fitting portion including a slant surface with respect to the center axis of the shaft member; and a shaft support member which supports the shaft member and which includes an abutment surface to come in face contact with the end surface of the shaft fitting portion to abut on the shaft end surface, wherein a spring is disposed to the lens holding frame to bias the end surface of the shaft fitting portion away from the abutment surface of the shaft support member.

9. A lens frame structure for a camera comprising: a shaft member along which a lens holding frame moves; the lens holding frame having a holding frame portion which holds a lens and a shaft fitting portion which is formed integrally with this holding frame portion and which fits the shaft member to slide along the shaft member, an end surface of the shaft fitting portion including a slant surface with respect to the center axis of the shaft member; and a shaft support member which supports the shaft member and which includes an abutment surface to come in face contact with the end surface of the shaft fitting portion to abut on the end surface, wherein the abutment surface of the shaft support member is a slant surface with respect to the center axis of the shaft member, and the slant surface and the abutment surface are flat surfaces.

10. The lens frame structure according to claim 9, wherein the shaft support member is a fixed frame member.

11. The lens frame structure according to claim 9, wherein the lens holding frame is formed of a synthetic resin material.

12. The lens frame structure according to claim 9, wherein the shaft fitting portion of the lens holding frame comprises a sleeve made of a metal.

13. The lens frame structure according to claim 9, wherein the end surface of the shaft fitting portion and the abutment surface of the shaft support member have a V-shape.

14. The lens frame structure according to claim 9, wherein the end surface of the shaft fitting portion and the abutment surface of the shaft support member have a conical shape.

15. The lens frame structure according to claim 9, wherein the end surface of the shaft fitting portion and the abutment surface of the shaft support member have a spherical shape.

16. A lens frame structure for a camera comprising: a shaft member along which a lens holding frame moves; the lens holding frame having a holding frame portion which holds a lens and a shaft fitting portion which is formed integrally with this holding frame portion and which fits the shaft member to slide along the shaft member, an end surface of the shaft fitting portion including a slant surface with respect to the center axis of the shaft member; and a shaft support member which supports the shaft member and which includes an abutment surface to come in face contact with the end surface of the shaft fitting portion to abut on the end surface, wherein a spring is disposed to the lens holding frame to bias the end surface of the shaft fitting portion away from the abutment surface of the shaft support member.

17. A lens frame structure comprising: a movable lens holding frame; a shaft which guides movement of the lens holding frame; and a support member which supports the shaft, wherein owing to an impact force applied to a lens frame, the lens holding frame and the support member are able to relatively move in an axial direction of the shaft to come in face contact with each other, and at least a part of regions of the lens holding frame and the support member which come in face contact with each other are slant surfaces with respect to the shaft.

* * * * *